Nov. 14, 1950  E. W. OETH  2,529,849
TRAILER FOR BOAT HANDLING
Filed Sept. 30, 1946  3 Sheets-Sheet 1
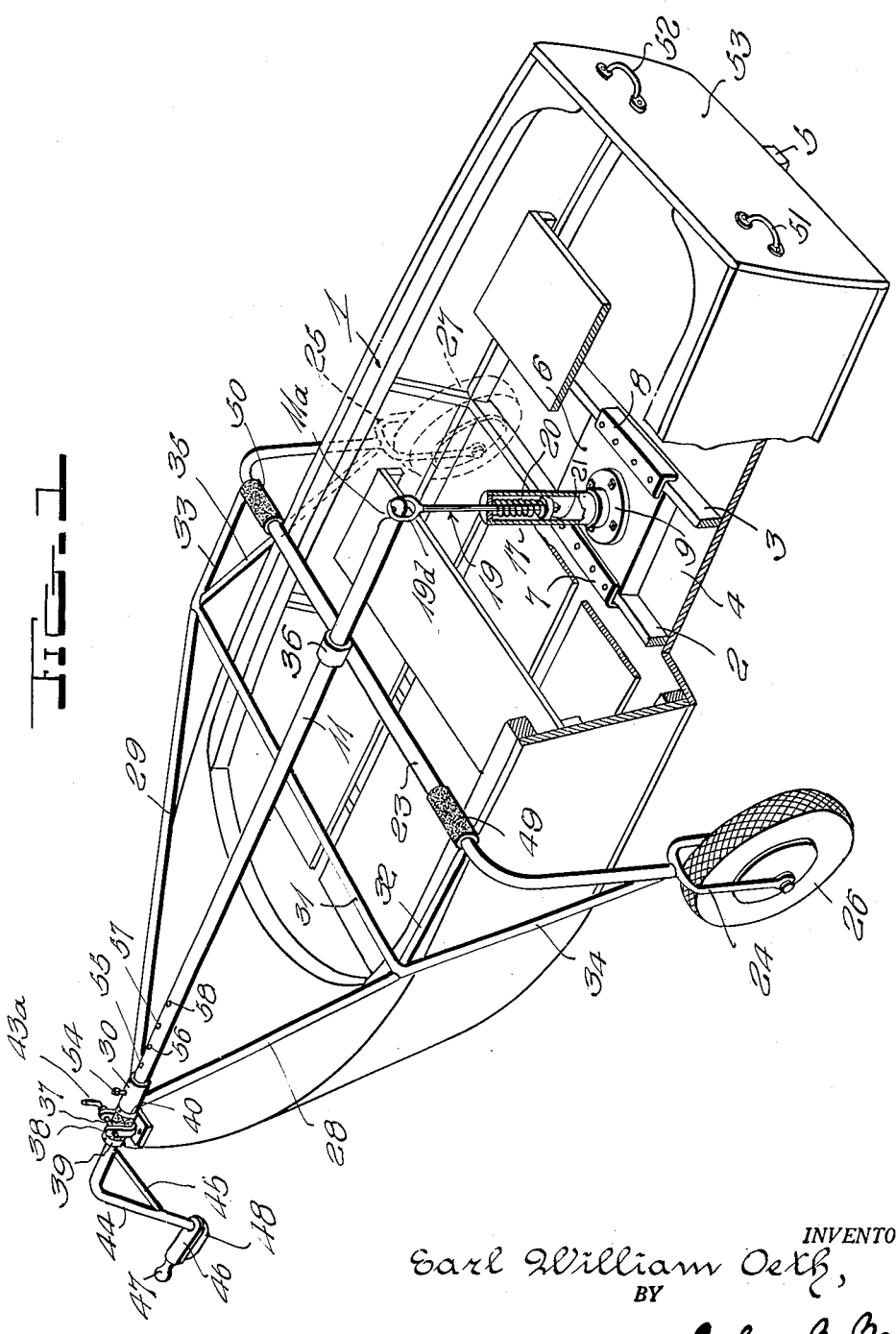
INVENTOR.
Earl William Oeth,
BY
John B. Brady
ATTORNEY

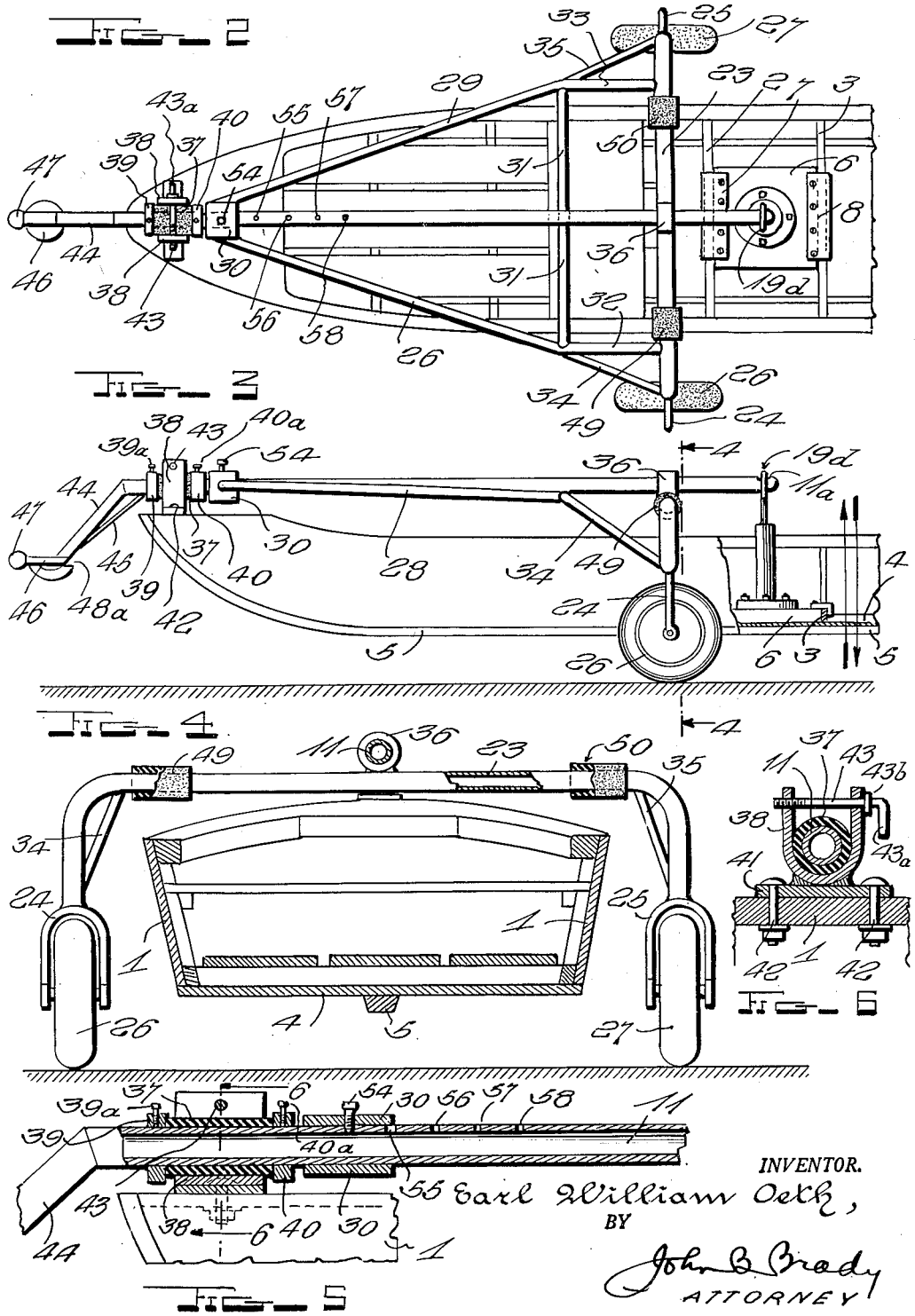

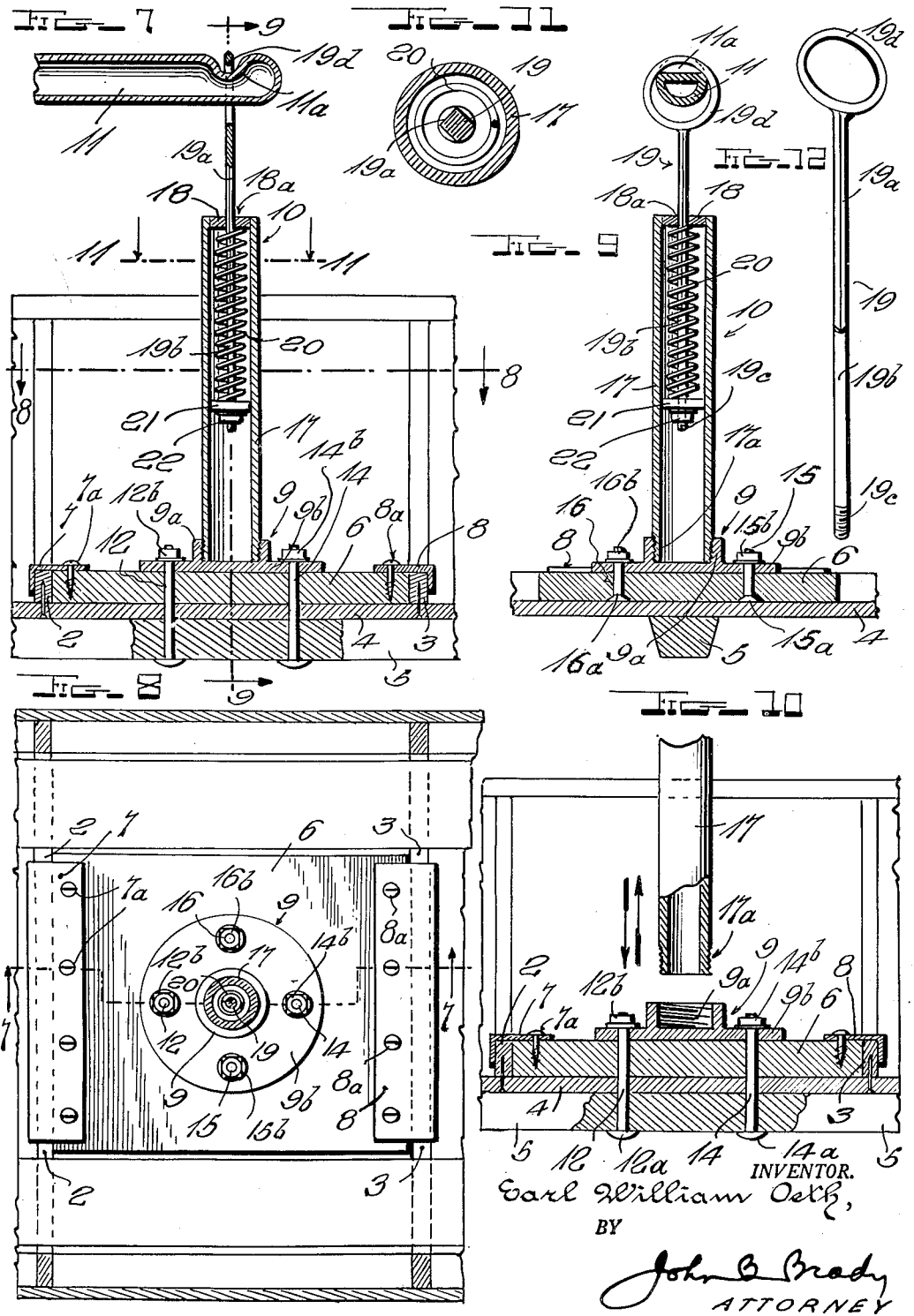

Patented Nov. 14, 1950

2,529,849

UNITED STATES PATENT OFFICE 2,529,849

TRAILER FOR BOAT HANDLING

Earl William Oeth, Evansville, Ind., assignor of one-third to Ruby A. Oeth, Evansville, Ind.

Application September 30, 1946, Serial No. 700,313

9 Claims. (Cl. 214—65)

My invention relates broadly to boat handling mechanism and more particularly to an apparatus for facilitating the transporting and launching of boats.

One of the objects of my invention is to provide a practical construction of boat handling apparatus which may be manufactured at relatively low cost on a mass production scale for facilitating the transporting, launching and handling of boats.

Another object of my invention is to provide a novel construction of boat handling apparatus by which a boat may be readily prepared for transportation, launched and retrieved by an individual without assistance.

Another object of my invention is to provide a construction of boat handling apparatus which involves the application of special hardware to boats of standard construction for co-action with a special design of trailer in which the boat supporting means includes shock absorbing means facilitating safe transportion of the boat through a coupling with a suitable vehicle.

Still another object of my invention is to provide an arrangement for pendently and removably suspending a boat from a trailer frame for coupling to a vehicle for transportation to and from the launching or retrieving location.

Another object of my invention is to provide a novel construction of fulcrum support and resilient pendent suspension between a boat and a trailer frame for facilitating the handling of a standard boat by an individual without assistance.

Other and further objects of my invention reside in an improved draw bar suspension means for handling a boat by means of a trailer, as set forth more fully in the specification hereinafter following by reference to the accompanying drawings, in which:

Figure 1 is a perspective view of the trailer of my invention showing a boat suspended thereby and ready for transportation to a launching location; Fig. 2 is a top plan view of the trailer of my invention showing a fragmentary portion of the boat suspended thereby; Fig. 3 is a side elevational view of the trailer illustrating a fragmentary portion of the boat suspended thereby, the view being broken away to more clearly illustrate the pendent suspension means in side elevation; Fig. 4 is a transverse sectional view taken substantially on line 4—4 of Fig. 3 with portions of the buffers carried by the transverse trailer frame and part of the transverse trailer frame broken away and illustrated in section; Fig. 5 is a fragmentary sectional view showing the clevis constituting the fulcrum means at the bow of the boat for detachably maintaining the longitudinal shaft in position with respect to the trailer frame; Fig. 6 is a vertical sectional view taken substantially on line 6—6 of Fig. 5 through the clevis at the bow of the boat; Fig. 7 is a fragmentary longitudinal sectional view through the boat and showing the pendent resilient supporting means therefor for engagement with the longitudinally extending shaft of the trailer; Fig. 8 is a horizontal sectional view taken substantially on line 8—8 of Fig. 7; Fig. 9 is a transverse sectional view taken substantially on line 9—9 of Fig. 7; Fig. 10 is a longitudinal sectional view showing the manner of coupling or uncoupling the pendent suspension means with respect to the hardware fitting carried by the bottom of the boat; Fig. 11 is a horizontal sectional view taken substantially on line 11—11 of Fig. 7; and, Fig. 12 is a perspective view of the suspension link which interconnects the longitudinal shaft of the trailer and the resilient suspension means for resiliently mounting the boat with respect to the trailer.

My invention is directed to a construction of trailer and arrangement of coacting hardware for the mounting of a boat on the trailer for facilitating the handling of the boat by an individual without assistance.

My invention has proven highly practical in manufacture, production and operation, and while one preferred embodiment of my invention will be explained hereinafter I desire that it be understood that I realize that modifications in form and arrangement of the trailer and the hardware associated with the boat may be employed and I intend no limitations upon my invention herein other than may be imposed by the claims appended to this specification.

The trailer is constructed from tubular pipe forming a rigid frame including a transverse saddle-like support the depending ends of which terminate in yoke-like members forming journals for the supporting wheels. The frame of the trailer is substantially braced by coacting pipe members which are interconnected adjacent the end of the trailer substantially in the form of a Y with a longitudinally extending central shaft-like tubular member slidably extendable through the trailer frame. The longitudinal shaft is provided at its end with coupling means for quick attachment or detachment with respect to a vehicle. The saddle-like frame is adapted to embrace a standard boat that may be legally transported over a highway. The boat is equipped with special hardware including a clevis constituting a fulcrum means in the bow of the boat and a pendent engaging means adjacent the stern of the boat or sufficiently removed from the center thereof to insure stability in equilibrium of the boat when pendently supported from the trailer. The fulcrum means in the bow of the boat is so arranged that the longitudinally extending tubular shaft may be readily received therein and suitably confined with respect thereto as the shaft is telescopically inserted through suitably spaced sleeve-like fittings associated with the trailer frame. The longitudinally extending shaft is laid in the clevis carried by the bow with a special shock absorbing fitting interposed therebetween and secured therein by a removable pin-like member and adjusted to a position in which the end of the shaft is substantially aligned with the hardware carried by the bottom of the boat intermediate the stern and center thereof. The shock absorbing means associated with the clevis is in the form of a tubular sleeve-like member of resilient material which may be confined upon the longitudinal shaft when the shaft has been adjusted to the desired position with respect to the trailer by means of adjustable collars adapted to be clamped on the shaft. It will be understood that the longitudinally extending shaft when once assembled with respect to the trailer remains permanently associated with the trailer frame but adjustable with respect to the frame over a sufficient range to enable the trailer to readily handle boats of varying lengths. Various lengths of shafts may be employed for different length boats.

The pendant support for the boat includes a hardware fitting which is permanently mounted in the bottom of the boat directly over the keel thereof and intermediate the center and stern of the boat. The flange is provided with a centrally internally extending screw-threaded portion. The screw threads are kept well lubricated and are arranged to receive the screw-threaded end of a guide cylinder which forms an enclosure for a shock absorbing coil spring member. A plunger member extends longitudinally through the guide and the shock absorbing coil spring, and terminates in a lugged end portion within the cylinder. The plunger member is provided with an eyelet on the end thereof through which the shaft of the trailer frame is adapted to be engaged for pendently suspending the mass of the boat and cushioning the mass of the boat by means of the shock absorbing coil spring member housed within the guide cylinder. The effective length of the plunger is so selected that the boat is pendently suspended in such a position that the gunwales of the boat are normally spaced from the saddle-like transverse portion of the trailer and injury to the boat prevented by suitable resilient cushioning means applied to the trailer frame.

Referring to the drawings in more detail reference character 1 represents the boat to be transported, launched and retrieved by an individual using the trailer of my invention. It will be observed that the harware for establishing coupling relationship with the pendent resilient suspension means is located between two of the transverse ribs 2 and 3 of the boat intermediate the center of the boat and the stern thereof. The transverse ribs 2 and 3 are arranged above the bottom 4 of the boat beneath which the longitudinally extending keel 5 extends. A centrally arranged base member 6 is disposed between transverse ribs 2 and 3, and over the keel 5, and is maintained in position by means of angle members 7 and 8. These members 7 and 8 are secured to base 6 by means of screws 7a and 8a and clamped to the tranverse ribs 2 and 3. The base board 6 provides a mounting means for the hardware 9 which is permanently mounted in the bottom of the boat to permit coupling and uncoupling relationship of the pendent resilient suspension means 10 which connects to the longitudinally connecting shaft 11 of the trailer.

The hardware 9 is constituted by a flange having a central internally screw-threaded portion 9a and a flat circular flange portion 9b. The flat circular flange portion 9b is apertured in symmetrically arranged diametrically disposed positions. In two of these positions I provide bolt members 12 and 14 which pass through the keel 5 and are secured thereagainst by headed ends 12a and 14a and which project through flange 9b and are secured with respect thereto by nuts 12b and 14b. In the other diametrically opposite apertured positions of flange 9b I provide securing bolt members 15 and 16 which have their headed ends countersunk into the supporting base 6 and which have their upstanding ends secured to flange 9b by means of nuts 15b and 16b. Thus, the hardware, securely attached to the supporting base 6, may be centered above the keel 5 and rigidly secured with respect thereto. The internally screw-threaded portion 9a of the hardware 9 which is attached to the boat bottom forms a coupling means for the screw-threaded end 17a of guide cylinder 17 of the pendent resilient suspension means 10. The guide cylinder 17 has a head 18 in the upper end thereof which is provided with a square aperture represented at 18a for the passage of the suspension link 19 shown more particularly in Fig. 12. The aperture 18a is polygonal in cross section and corresponds with the polygonal section 19a of suspension link 19. The suspension link 19 has the lower extremity thereof reduced to cylindrical section represented at 19b of smaller gage than the polygonal section 19a enabling the link 19 to be readily passed through aperture 18a in head 18 of guide cylinder 17 and through the convolutions of coil spring 20 and through the flange plate 21 to establish screw-threaded connection with confining nut 22 which engages screw threads 19c on the end of suspension link 19 for thereby maintaining the suspension link 19 in a continuously tensioned condition against withdrawal axially of the guide cylinder.

The upper extremity of the suspension link 19 terminates in an eye shown at 19d. The eye 19d serves as an engaging means for the recessed notch 11a formed in the end of the longitudinally extending shaft 11 of the trailer frame. The trailer frame comprises the transverse saddle member 23 formed from metallic tubular material projecting on opposite sides of the boat 1 for a distance sufficient to clear the sides of the boat and depending downwardly and terminating in yokes 24 and 25 which serve as journals for the wheels 26 and 27. The transverse saddle-like frame 23 is rigidly braced by tubular frame portions which may take a variety of shapes, but which I have indicated consist of tubular members 28 and 29 connected with the saddle-like frame 23 and terminating in a sleeve-like head 30 forming a substantially Y-shaped frame which is braced by interconnecting tubular portions 31, 32 and 33. The interconnected tubular frame portions 31, 32 and 33 are further braced by angularly disposed tubular frame-like portions 34 and 35.

The transversely extending saddle-like frame 23 is provided with a centrally arranged sleeve-like supporting member 36 through which the longitudinally extending central shaft-like tubular member 11 is adapted to adjustably slide. The tubular member 11 passes through the sleeve-like member 30 and is provided with an adjustably positioned resilient tubular buffer 37 thereon. The tubular buffer 37 is slidable in position along tubular member 11 to provide a resilient seat for tubular member 11 in the clevis 38 which is mounted adjacent the bow of the boat 1.

When the position of the buffer 37 on tubular member 11 is generally determined the buffer 37 is confined in the selected position by means of collars 39 and 40 which may be clamped on member 11 by means of set screws 39a and 40a for confining the buffer 37 in selected position. The clevis 38 which constitutes the hardware fitting that is mounted adjacent the bow of the boat is secured in appropriate manner, such as by welding or otherwise, to the plate 41. The plate 41 is secured by means of bolts 42 in a position adjacent the bow of the boat 1 in such arrangement that the axis of the clevis substantially coincides with the central beam of the boat. The sides of the clevis 38 are apertured in transverse alignment for the insertion of the transversely extending pin 43 which may be quickly inserted or removed to confine or permit the withdrawal of the shaft 11 with respect to the clevis. A suitable manual grip portion 43a is provided on pin 43 in association with a flange 43b to facilitate insertion of the pin and removal of the pin when the longitudinally extending shaft 11 is being located in position. When the shaft 11 is confined within clevis 38 shock and vibration is reduced by the cushioning effect of buffer 37.

The end of the shaft 11 is provided with a downwardly extending angular portion 44 rigidly braced with respect to the longitudinally extending portion 11 by suitable brace 45. The extremity of the downwardly extending frame portion 44 terminates in a plate member 46 and coupling member 47 attachable to an automobile. The skid member 48 is supported by plate member 46 and prevents the end of the shaft from plowing into the ground. It will be observed that skid member 48 projects rearwardly of plate 46 to provide a lip 48a around which a tow chain or rope may be anchored for attachment to a vehicle in pulling the trailer.

In order to prevent injury to the boat, under conditions where the boat when suspended by the trailer may tend to sway from side to side, I arrange resilient buffers 49 and 50 on the transverse saddle-like frame 23 against which the gunwales of the boat may be cushioned should the boat sway sufficiently while in transportation to actually strike the trailer frame.

In the operation of the boat handling apparatus of my invention it will be readily understood that a boat resting on the ground may have the trailer moved to a straddling position over the boat and the shaft 11 moved to the required adjusted position through sleeves 30 and 36 as may be subsequently fixed by the bolt 54 entering the selected aperture 55, 56, 57 or 58 in the shaft 11. The shaft 11 is then raised so as to align the end of the shaft with the protruding eye 19d in the suspension rod 19 associated with the shock absorbing coil spring 20. The front end of the shaft 11 may then be lowered and secured in the clevis 38 in the bow of the boat raising the boat on a substantially even keel. The trailer is then ready to be coupled to the car for transportation. When the boat is moved to the launching location, the trailer may be uncoupled from the vehicle. The trailer is then moved to the shoreline and the boat moved into the water as far as practicable, the wheels of the trailer actually submerging below the water. The boat may now be detached from the trailer by simply removing the pin 43 from the clevis 38, raising the frame of the trailer from position to disengage the shaft 11 from the shock absorber 10 and the trailer may then be moved away from the boat, leaving the boat floating in the water.

When it is desired to retrieve the boat the boat is moved as close as possible to the shore with the aid of hand grips 51 and 52 extending from the transom 53 and the trailer then moved into the water into a position straddling the boat and with the shaft 11 extending upwardly at an angle. The end 11a of the shaft 11 is engaged through the shock absorber suspension rod eyelet 19d and then the shaft 11 and frame of the trailer angularly shifted about the axes of the wheels 26 and 27 of a cantilever, as centers, thereby lifting the stern of the boat. The shaft 11 is then laid in the clevis 38 and the pin 43 inserted, whereupon the trailer is ready to be pulled out of the water with the boat attached thereto. This is accomplished entirely manually or through a rope attached to the vehicle depending upon the nature of the launching site. The end of the shaft may then be attached to the mobile unit and ready for transporting. It will be observed that all of these functions including both detachment and attachment of the boat to the trailer may be performed by one person without other assistance.

For situations where the trailer and boat is bogged down, the skid 48 adjacent the end of the shaft 11 makes it possible to skid the trailer from the water by a rope attached to an automobile. The entire unit is built in such a way that flexibility and rigidity is achieved. Recent road tests have proven that this unit may be driven at high speed safely. Rough roads, gullies, and rough terrain, do not effect the boat is any way. Road shock of any nature is positively not transmitted to the boat and is very definitely absorbed in the spring suspension mechanism 10. A unit after having been driven under all conditions over 600 miles was analyzed and no ill effects found on the boat. Toe in and alignment on the trailer after rigorous tests did not vary in original alignment. This method of handling boats eliminates all physical strain in lifting; it also eliminates the road and wind hazards of carrying a boat on the top of a car. Luggage may be carried in the boat as well as all equipment and gear for outdoor activities. Loaded boats may be as easily launched and removed from the water as an unloaded one. I emphasize the fact that in transportation the method of suspension which I employ does not subject the boat to appreciable side-to-side sway.

While I have described my invention in one of its preferred embodiments I realize that changes may be made in the structure of the trailer and supporting means and I desire that it be understood that I intend no limitations upon my invention other than may be imposed by the scope of the appended claims.

What I claim as new and desire to secure by Letters Patent of the United States is as follows:

1. In an apparatus of the class described, a boat having a fulcrum device secured to the bow and a screw-threaded connecting flange secured adjacent the stern, a trailer comprising a frame and wheeled support, connection means between said frame support and the fulcrum device adjacent the bow of the boat and connection means between said frame support and the screw-threaded flange adjacent the stern of the boat, said last mentioned connection means including a guide cylinder screw-threaded at one end for detachably engaging the screw-threaded flange adjacent the stern of the boat, a coil spring and a coacting plunger operatively connected with said coil spring and movable axially of said cylinder and detachably connected with said frame support, and forming a single pendant suspension for the boat from said trailer.

2. In an apparatus of the class described, a boat having a clevis mounted adjacent the bow thereof, a screw-threaded flange supported adjacent the stern thereof, a trailer including a frame straddling said boat and terminating in a wheeled support, said frame support including a resilient sleeve-like member aligned with said clevis, a shaft member adjustably positioned through said resilient sleeve-like member and engageable by said clevis, shock absorbing means detachably connected with the screw-threaded flange adjacent the stern of the boat, and resilient means for establishing a single pendant centrally aligned connection between the end of said shaft and said shock absorbing means.

3. In an apparatus of the class described, a boat having hardware fittings adjacent each end thereof, a trailer including a wheeled support straddling said boat and means establishing detachable connections between said wheeled support and the hardware fittings in said boat, the connection between said wheeled support and the hardware fitting adjacent the bow of the boat including a resilient cushioning sleeve and the connection between said wheeled support and the hardware fitting adjacent the stern of the boat including a pendantly suspended spring loaded centrally aligned shock absorber, and a pair of symmetrically arranged resilient bumpers disposed in spaced positions on said wheeled support for cushioning movement of the boat with respect to said wheeled support.

4. In apparatus of the class described, a boat having fittings secured adjacent each end thereof and disposed substantially on the fore and aft center line, a trailer including a wheeled support straddling said boat, resilient means for detachably securing said support to said fittings, the means adjacent the stern of the boat including an expansible and contractible shock absorber and resilient bumpers disposed on said support to engage and space said boat therefrom.

5. In apparatus of the class described, a boat having fittings secured adjacent each end thereof and disposed substantially on the fore and aft center line, a trailer including a wheeled support straddling said boat, means including a resilient sleeve for detachably securing said support to the fitting adjacent the bow of said boat, means including an expansible and contractible shock absorber for securing said support to the fitting adjacent the stern of said boat and resilient bumpers disposed on said support to engage and space said boat therefrom.

6. In apparatus of the class described, a boat having fittings secured adjacent each end thereof and disposed substantially on the fore and aft center line, a trailer including a wheeled support straddling said boat, and resilient means for detachably securing said support to said fittings, the means adjacent the stern of the boat including an expansible and contractible shock absorber.

7. In an apparatus of the class described, a boat having a fulcrum device secured to the bow and a fitting secured adjacent the stern, a trailer comprising a frame and wheeled support, connection means between said frame and the fulcrum device adjacent the bow of the boat and connection means between said frame and the fitting adjacent the stern of the boat, said last mentioned connection means including a guide cylinder detachably engaging the fitting adjacent the stern of the boat, a coil spring and a coacting plunger operatively connected with said coil spring and movable axially of said cylinder and detachably connected with said frame and forming a single pendant suspension for the boat from said trailer.

8. A trailer for boat handling comprising a frame and wheeled support, a fulcrum device for securing said trailer to a boat, a fitting for connecting the trailer to the boat at a location spaced from said fulcrum device, a guide cylinder, means for detachably connecting said guide cylinder to said fitting, and a coil spring and a coacting plunger operatively connected with said coil spring and movable axially of said cylinder and detachably connected with said frame and forming a pendant suspension for the boat from said trailer.

9. A two-wheeled trailer for boat handling comprising a unitary frame rockable about the axis of the wheels, a fulcrum device for securing said trailer to a boat, an upstanding fitting secured to the boat for connecting the trailer to said boat at a point spaced from said fulcrum device in alignment with said fulcrum device along the longitudinal center line of the boat, said fitting including vertically disposed shock absorbing means detachably connected with said frame and constituting a single pendant suspension for the boat from said trailer.

EARL WILLIAM OETH.

REFERENCES CITED

The following references are of record in the file of this patent:

UNITED STATES PATENTS

| Number | Name | Date |
|---|---|---|
| 251,690 | Bourke | Jan. 3, 1882 |
| 1,938,142 | Hallenbeck | Dec. 5, 1933 |
| 2,375,754 | Ballinger | May 15, 1945 |
| 2,415,771 | Van Agtmael | Feb. 11, 1947 |
| 2,452,937 | Krake | Nov. 2, 1948 |